Feb. 24, 1970   J. E. McWILLIAMS   3,497,091
SYSTEM FOR HANDING BAGGED MAIL
Original Filed May 28, 1965   5 Sheets-Sheet 1
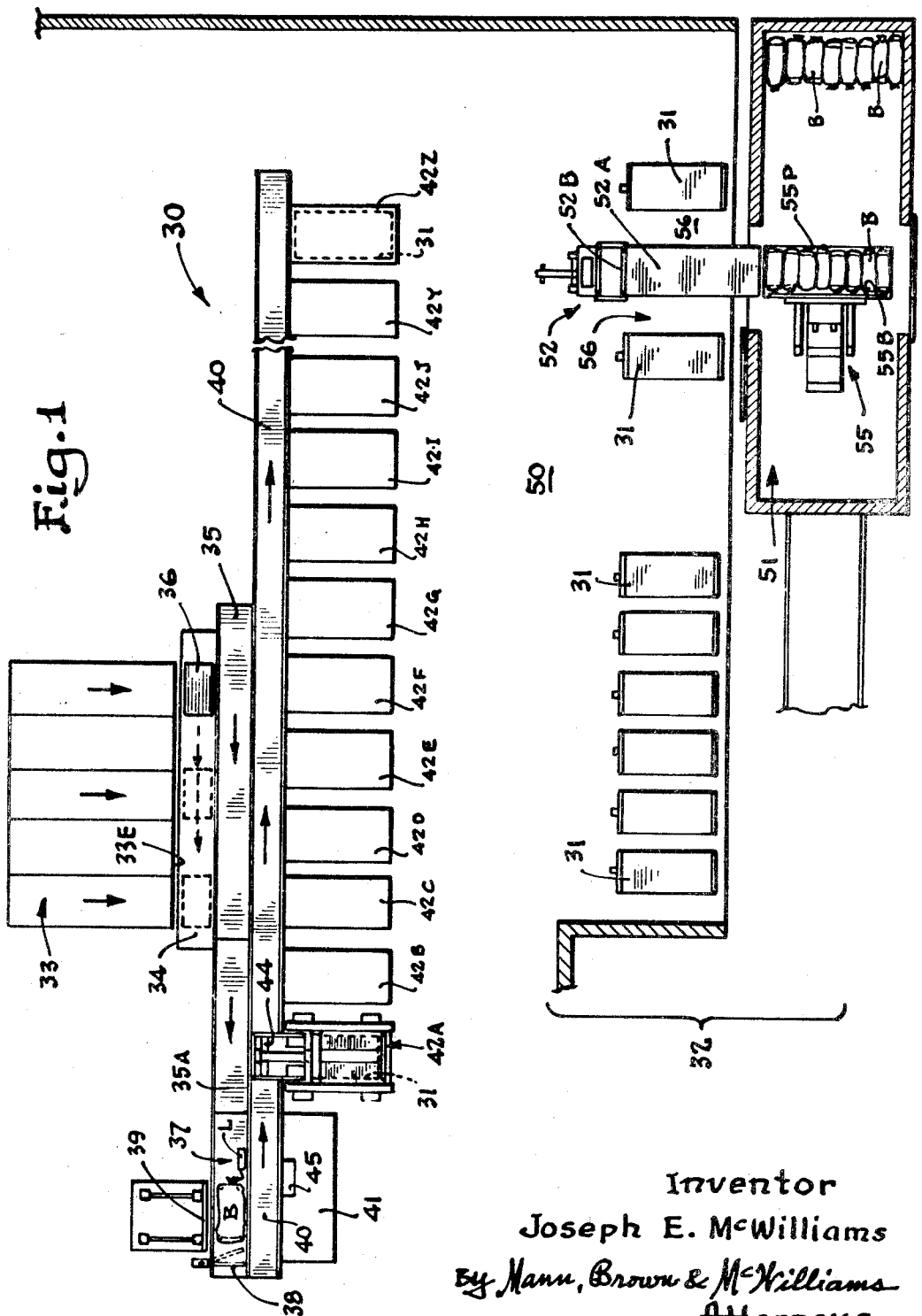
Inventor
Joseph E. McWilliams
By Mann, Brown & McWilliams
Attorneys

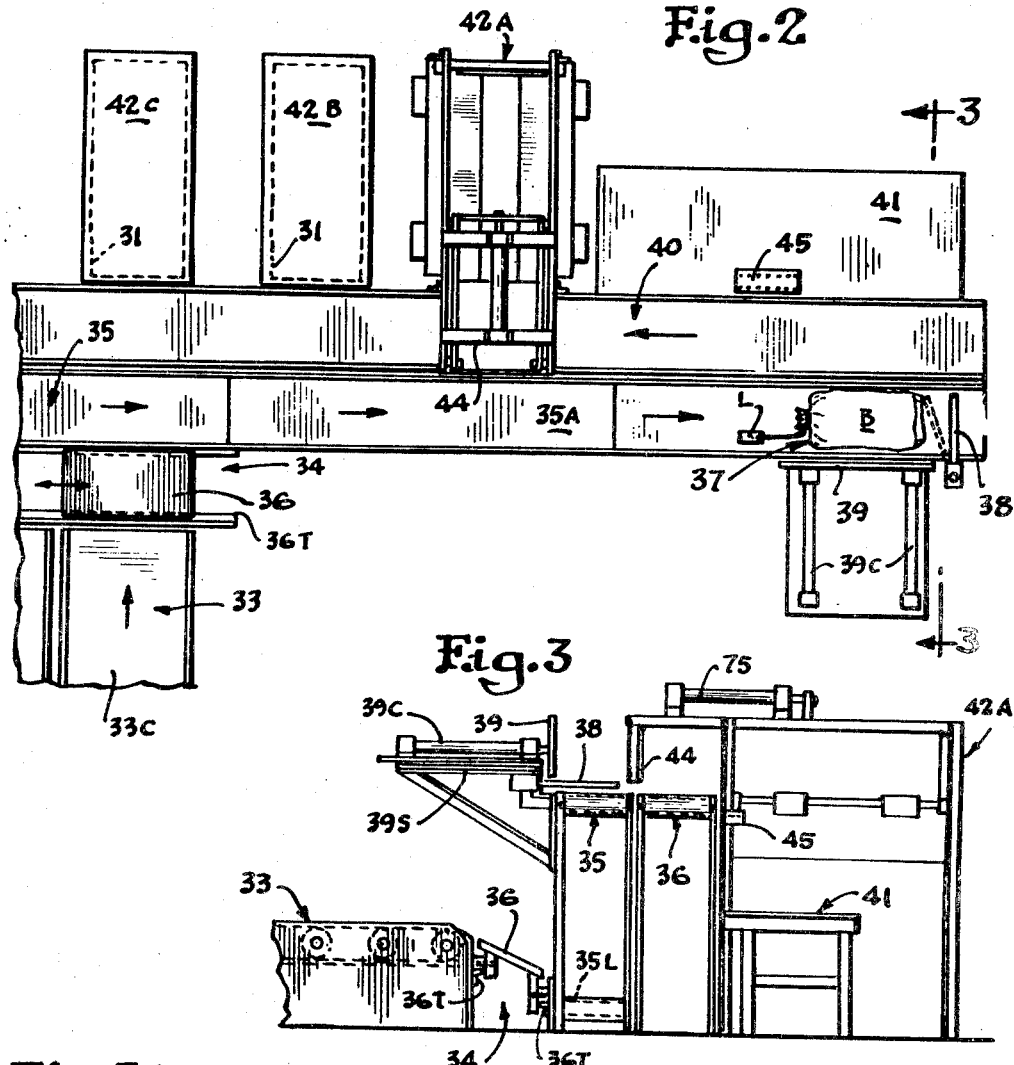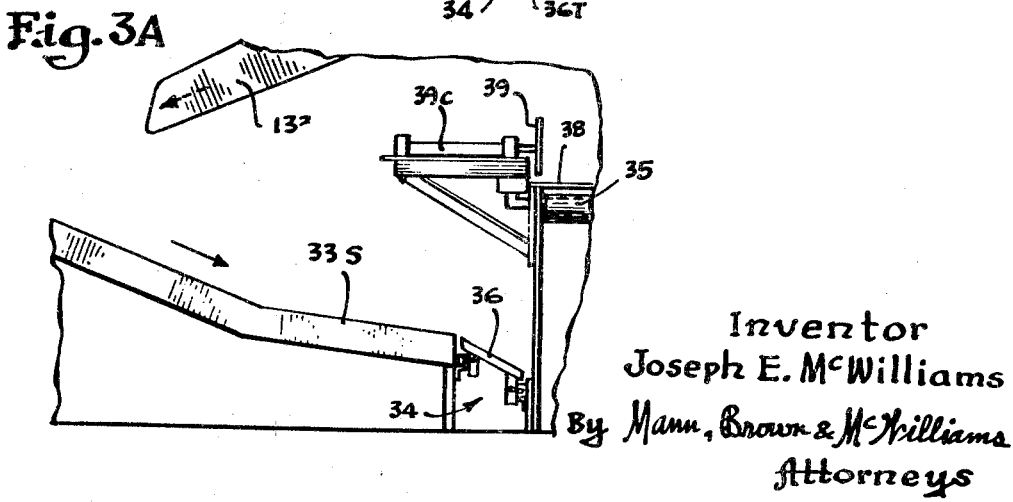

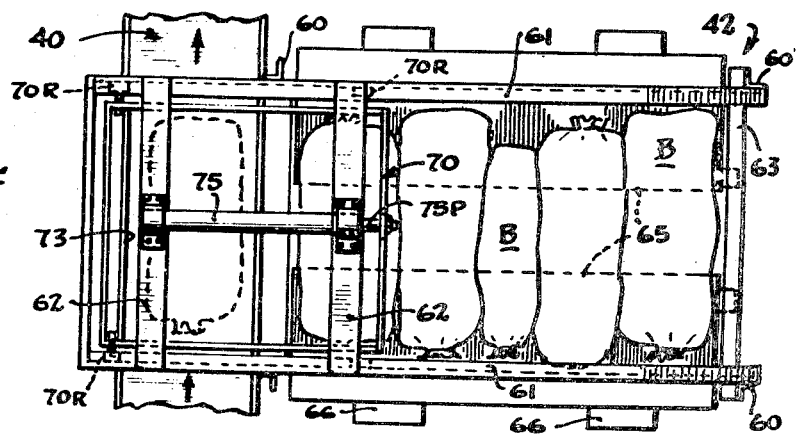
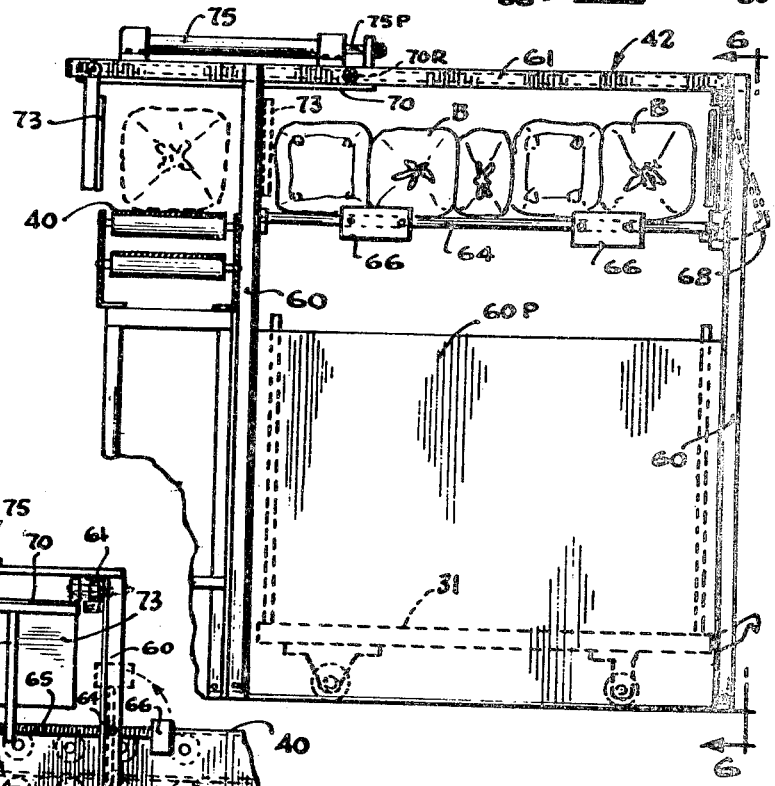
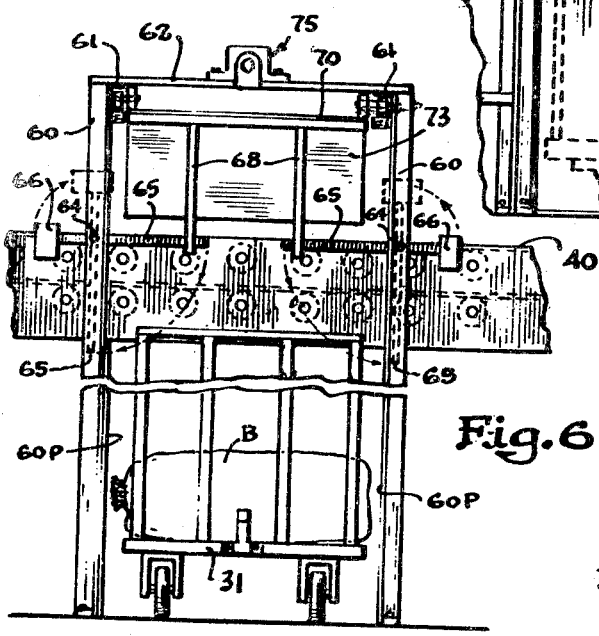

Feb. 24, 1970  J. E. McWILLIAMS  3,497,091
SYSTEM FOR HANDLING BAGGED MAIL
Original Filed May 28, 1965  5 Sheets-Sheet 4
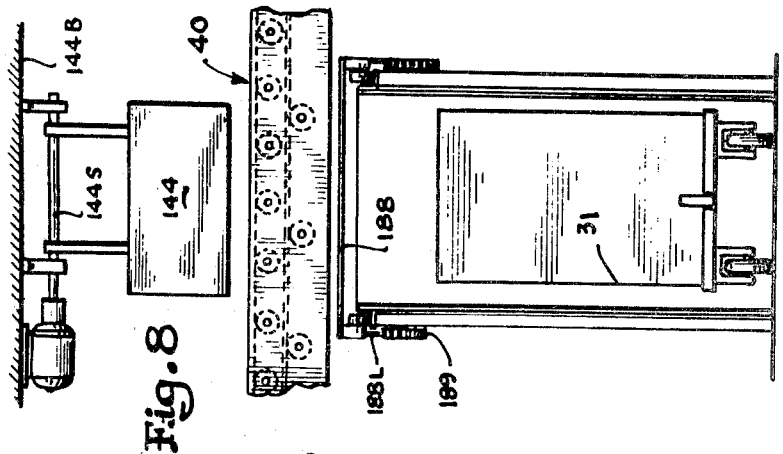
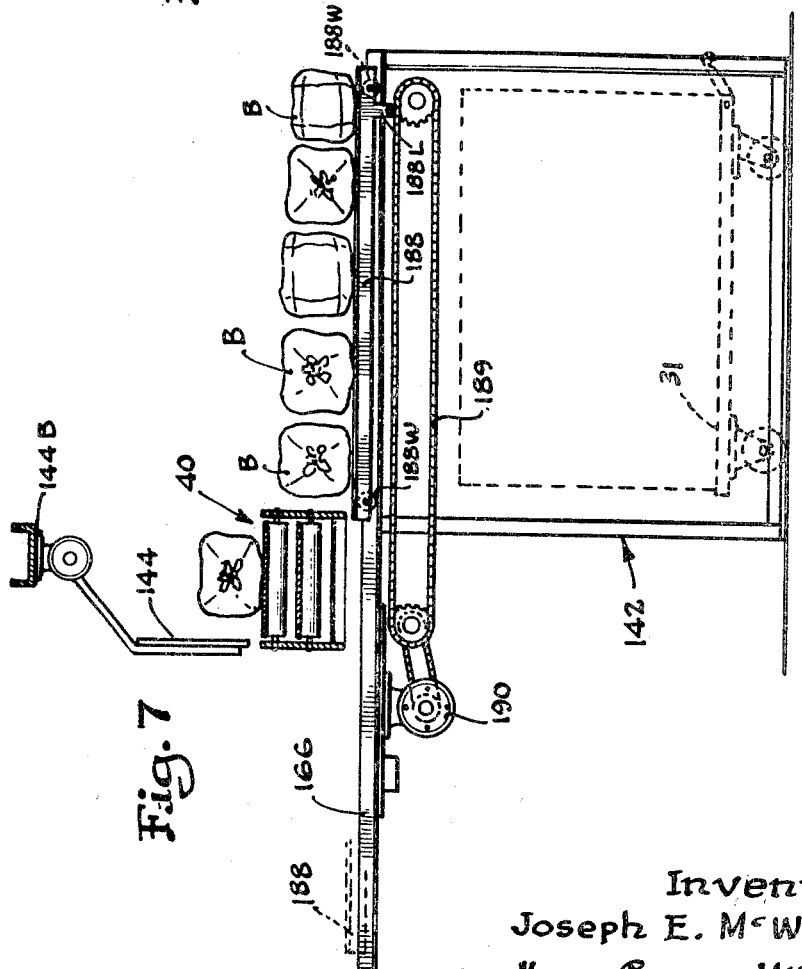
Inventor
Joseph E. McWilliams
By Mann, Brown & McWilliams
Attorneys

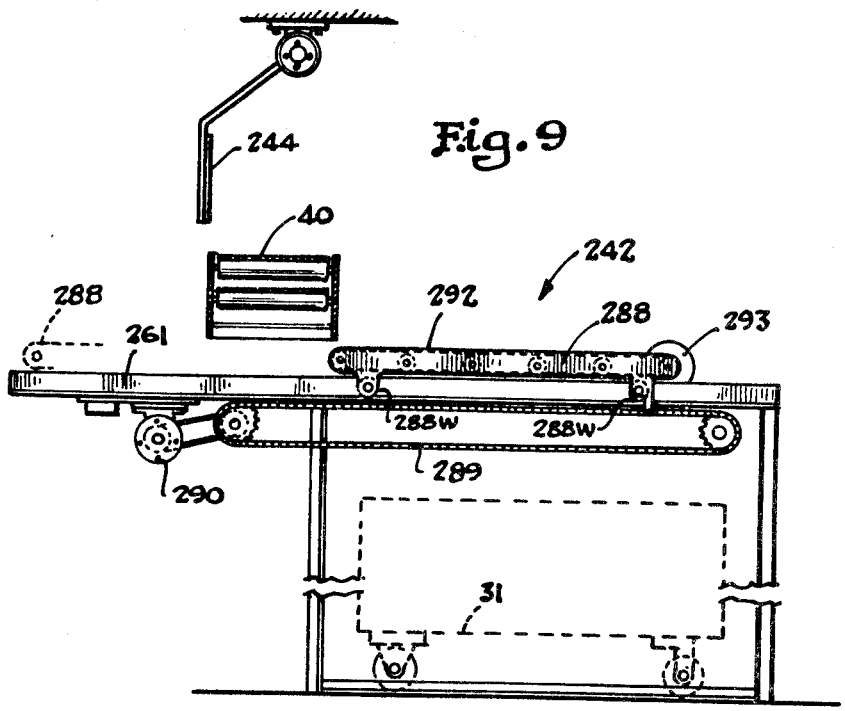

United States Patent Office 3,497,091
Patented Feb. 24, 1970

3,497,091
SYSTEM FOR HANDLING BAGGED MAIL
Joseph E. McWilliams, 1245 Canterbury Lane,
Glenview, Ill. 60025
Application May 28, 1965, Ser. No. 459,723, now Patent
No. 3,429,458, which is a division of application Ser. No.
422,347, Dec. 30, 1964, now Patent No. 3,221,912,
which in turn is a division of application Ser. No.
139,526, Sept. 20, 1961, now Patent No. 3,164,271.
Divided and this application Feb. 6, 1968, Ser. No.
726,260
Int. Cl. B65g 37/00
U.S. Cl. 214—152     1 Claim

ABSTRACT OF THE DISCLOSURE

This invention relates to methods and apparatus for handling loaded mail bags that are labeled as to destination on a mass basis in which the bags are deposited at an initial gathering area where they are applied to a distributing conveyor in single file form and are oriented to extend longitudinally of the conveyor, which distributing conveyor conveys them past a plurality of collecting stations at which the bags allocated to common destinations are displaced from the conveyor while maintaining their said orientation and are loaded in balanced vertical stacks on sideless hand trucks while maintaining said orientation, which trucks when loaded are collected in a storage area and are arranged according to destination to await a transport vehicle such as a railroad car or highway vehicle. When the transport vehicle arrives, the hand trucks are moved to the location of the vehicle and the bags are loaded into the vehicle in units of one or more of the stacked tiers, all while maintaining the orientation of the bags that is achieved when they are loaded onto the respective hand trucks.

---

This application is a division of my application Ser. No. 459,723, filed May 28, 1965 (now Patent No. 3,429,-458), which is a division of my application Ser. No. 422,347, filed Dec. 30, 1964 (now Patent No. 3,221,912), which is a division of my application Ser. No. 139,526, now Patent No. 3,164,271, granted Jan. 5, 1965.

This invention relates to the handling of loaded and tagged bags of mail in terminals and the like, and particularly it relates to a system of sorting the bagged mail as to destination, and subsequently loading the bags into the carrier or transport bodies.

The Post Office Department pays carriers of bulk mail in bags on a cubic foot basis, and for purposes of economy the postal authorities require that bulk mail loaded in railway cars, motor trucks or trailers be loaded in a particular manner so as to fully utilize the capacity or volume of the transport body up to the maximum height to which the bags may be lifted by the workers in stacking. This loading may differ somewhat according to the type of carrier or transport body that is being used, but in general the bags are laid down in tiers that run transversely of the length of the transport body with the length of the bags extending longitudinally with respect to the transport body. Variations in bag loading of course cause variations in width of the loaded bags, but regardless of these variations, the bags are snugly related to each other in each tier, and successive tiers are placed one upon the other until the stack reaches the internal height of the transport body. This general plan, in the case of side loading bodies, such as railway cars, is modified in the area between two doors so that the tiers and stacks run lengthwise of the body with the length of the bags extending transversely of the transport body.

The requirement that the transport bodies be loaded completely according to the general plan above outlined has constituted one element in complicating and increasing the cost of sorting, handling and loading bagged mail, and in the entire sorting, handling and loading process, the tiring manual effort required has long been considered to be objectionable. Thus in the handling system heretofore provided, the operations have been broadly considered as falling into a series of incoming operations and a series of outgoing operations, all of which have involved tiring and time-consuming manual operations, many of which were repeated many times in the course of the entire operation. Generally considered, the incoming operations have constituted the accumulation of bags on sorting floors, and sorting of these bags and loading the same on hand trucks in loads for subsequent reloading onto particular outgoing carriers, and then moving the loaded hand trucks to a temporary storage area. The outgoing operations comprise the moving of the loaded hand trucks to the dock area and into positions that may be required for transporting the bags into the transport body, and then transferring and stacking the bags in the transport body.

More specifically with relation to the incoming operations, the bags are dumped onto the sorting floor in random piles, and these sorting floors are relatively large with trucks of one kind or another positioned around the sorting floor. In some instances there may be as many as ninety trucks about the sorting floor to provide for the destinations that may be included in the bags that are supplied to the sorting floor, and of course in such an instance, many of the trucks may be positioned from 100 to 150 feet from the point where a bag is located on the sorting floor. The worker, in sorting and loading the bags onto the proper hand trucks must stoop down and grasp the bag so as to lift the bag into position on the hand truck. This loading operation must be carried on carefully in order to assure that the stacked bags will remain in position on the truck when it is subsequently moved. The worker must then walk back to the sorting floor and repeat this operation. As the stacks of bags on the truck becomes higher, greater effort is of course involved, and this is particularly tiresome where the bags are loaded up to or beyond the allowable maximum of eighty pounds.

In the outgoing operations, the unloading of the bags from the hand trucks and the carrying or dragging of these bags into position in the carrier body for stacking according to the loading plan above described, involves further manual work that is extremely tiresome, and throughout all of these handling operations in both the coming and outgoing portions of the work, there is a repetition of the orienting movements as the bag is oriented into position on the hand trucks and subsequently as it is oriented in placing it in position in the tiers of the transport body.

In view of the foregoing it is the primary object of the present invention to provide an improved system for handling, sorting and loading bagged mail, and to do this in such a way that walking, stooping and lifting are minimized and in such a way that time losses are reduced. Another and related object of this invention is to provide a system of the foregoing character wherein the loaded mail bags are oriented early in the cycle of operations, and in which this initial orientation is maintained throughout all of the subsequent handling operations so as to thereby reduce the physical effort and the time that has heretofore been required in respect to the orientation of the bags.

Another important object of this invention is to substantially eliminate manual lifting operations in the sorting, handling and loading of bulk mail bags, and it is a further object to eliminate such manual lifting operations through the adoption of standardized sequence of handling and loading operations which enables the lifting of the bags to be accomplished through the use of power means.

Other and further objects of the present invention will be apparent from the following description and claims, and are illustrated in the accompanying drawings, which, by way of illustration, show preferred examples of the present invention and the principles thereof, and what is now considered to be the best mode in which to apply these principles. Other embodiments of the invention embodying the same or equivalent principles may be made as desired by those skilled in the art without departing from the invention.

In the drawings:

FIGURE 1 is a plan view schematically illustrating the mail bag handling and sorting system of the invention;

FIGURE 2 is an enlarged plan view of the incoming portion of the system shown in FIGURE 1;

FIGURE 3 is a vertical view illustrating the transfer and routing stations of the system as well as the incoming platform means and one of the collecting stations;

FIGURE 3A is a view similar to a portion of FIGURE 3 and illustrating an alternative incoming station;

FIGURE 4 is a plan view of the gathering station shown in FIGURES 2 and 3;

FIGURE 5 is a view somewhat more detailed than FIGURE 3 and illustrating further physical characteristics of the gathering station;

FIGURE 6 is an end view of the gathering station as viewed from the line 6—6 of FIGURE 5;

FIGURES 7 and 8 are side and end views showing an alternative form of bag assembler and truck loader; and FIGURES 9 and 10 are side and end views respectively of still another form of hand truck loader.

THE SYSTEM IN GENERAL

For purposes of disclosure the system of the present invention has been schematically illustrated in FIGURE 1 to show the various operating steps and apparatus whereby loaded and labeled mail bags B may be sorted and loaded with increased efficiency. In FIGURE 1 the broad characteristics of the system are illustrated, and specific details of apparatus are shown in other views and will be described hereinafter. In general the system comprises an incoming section 30 in which the random assortment of loaded bags is sorted as to destination and loaded in predetermined oriented relation on conventional sideless hand trucks 31 allocated to the respective destinations, and a storage and loading section 32 in which the loaded hand trucks 31 are accumulated and temporarily stored and are thereafter loaded into the transport body of a truck or railway car.

Thus, with respect to the incoming section 30 of the system, an initial gathering area 33 is provided on which a random assortment of loaded and labeled mail bags B may be deposited from trucks, conveyors and the like, and the bags B are moved across the area 33, due for example to floor slope, or by conveyors, to one edge 33E of the area 33 that borders one side of a depressed walkway 34. Along the other side of the depressed walkway 34, a transfer conveyor 35 is extended at a level somewhat lower than the level of the edge 33E, and a worker stationed in the depressed walkway 34 may thus grasp a bag B from the adjacent portion of the area 33 and may transfer the bag across the walkway 34 and onto the conveyor 35 in a predetermined oriented relation with respect to the conveyor. Such transfer and orientation are accomplished without lifting the bag B, and by provision of a sloping, movable transfer bridge 36 extended across the walkway 34, the exertion involved is confined to the dragging effort required to start the transfer and turn or orient the bag B as it is deposited on the conveyor 35.

The oriented bags B are advanced or carried by the conveyor 35 so as to be moved one by one into a transfer station 37 where a trip member 38 that is engaged by the leading bag stops the conveyor 35 with the leading bag B in substantially a predetermined relation to a pusher 39. This pusher 39 is thereafter operated as will be described to push the bag off of the conveyor 35 and onto an adjacent distributing conveyor 40. The distributing conveyor 40 is of the step-by-step kind, and as shown, moves in a direction opposite to the direction of the conveyor 35. When the conveyor 40 stops with a bag B positioned opposite the pusher 39, and with the trip member 38 actuated, the pusher 39 operates through forward and return strokes to transfer the bag B to the conveyor 40. With the trip member 38 in released condition the return of the pusher 39 to its retracted position, again starts the conveyor 35. In the transfer of the bag B to the conveyor 40 the originally established orientation of the bag B is maintained, and the destination tag L of the bag B may be readily and easily examined by an operator working at a routing station 41 adjacent the transfer station 37 and along a portion of the conveyor 40.

The distributing conveyor 40 extends or travels past a succession of collecting stations 42A to 42Z, allocated respectively to different destinations that may be included among the bags B that are to be sorted and loaded, and in order that groups of bags B gathered at the respective stations 42A to 42Z may be easily discharged onto sideless hand trucks 31, the conveyor 40, and the transfer station 37 and the several collecting stations 42 are disposed in an elevated relation with respect to the floor upon which the trucks 31 rest, thus to permit gravity discharge of a gathered group of similarly oriented bags B onto a hand truck disposed beneath or within a collecting station 42. As herein shown the transfer conveyor 35 includes an inclined portion 35A which moves the bags B to the higher levels of the transfer station 37.

When a particular bag B has moved into position opposite the proper collecting station 42, a pusher mechanism 44 is operated automatically to push the bag B laterally off of the conveyor 40 and onto the collecting station, and as this is done, the originally established orientation of the bag B is maintained. The pusher mechanisms 44 at the several collecting stations 42 are rendered operative selectively by settable control means 45 located at the routing station 41 according to the destination label L carried by each bag B as it is moved through the transfer station and onto the distributing conveyor 40.

As will be described in detail hereinafter, the bags B discharged successively at a particular collecting station 42 are collected there in a uniform side by side relation until they constitute a group large enough to form a complete tier from end to end on a truck 31, and the group of bags is then discharged onto the related hand truck 31. After several tiers or groups of bags have thus been loaded on a truck 31, a new truck 31 is put in place beneath the particular station 42, and the loaded truck 31 is moved to a temporary storage area that forms part of the storage and loading section 32 of the system.

As the fully loaded hand trucks 31 are removed from the respective collecting stations 42A to 42Z, these trucks are moved onto a relatively large storage floor 50 that constitutes a part of the temporary storage and loading section 32 of the present system. These fully loaded hand trucks 31 are of course arranged in groups on the storage floor 50 according to destination or are arranged in groups that may include several destinations which are to be loaded into a common transport body such as a railway car body 51 shown in FIGURE 1.

When a sufficient number of fully loaded hand trucks 31 have been assembled to take care of the loading of a particular transport body 51, the transport body is brought into position along one edge of the area 50 which constitutes a loading platform, and the mail bags B from the several trucks 31 are put in position within the transport body 51 so as to form a compact and uniformly arranged load within the body 51. This form of loading is standard and involves the arrangement of the bags B in tiers as illustrated within the body 51 in FIGURE 1, and similar tiers are arranged one upon another so as to fill the transport body from floor to ceiling.

Under the present invention this loading operation is accomplished in such a way that the manual effort involved is minimized, and is further accomplished in such a way that the manual operations are interrelated so that the minimum of help is required. Thus a bag assembler unit 52 is provided that constitutes a wheeled vehicle having a relatively long platform 52A, this platform 52A being of a length that is at least as great as the width of the transport body that is to be loaded. This dimension in almost every instance exceeds the length of the hand trucks 31, and for this reason the bags on the hand trucks 31 are transferred manually from the hand trucks 31 onto the bag assembler platform 52A, as will be described in further detail hereinafter. Once the platform 52A has been loaded with a group of bags B sufficient to form a tier across the entire width of the transport body 51, these bags are pushed off of the platform 52A endwise thereof and onto the platform 55P of a self propelled lift truck 55 that is at this time located inside of the transport body 51. This movement of the bags off of the platform 52A and onto the platform 55P is accomplished by a pusher plate 52B as will hereinafter be described. The lift truck 55 is of the general kind shown in Bomer Patent No. 2,256,454, patented Sept. 16, 1941.

The loading of the platform 52A of the bag assembler 52 is accomplished by moving a pair of end trucks 31 into position on opposite sides of the platform 52A as shown in FIGURE 1 so as to leave a walkway 56 on each side of the bag assembler 52. A worker may thus stand in each of these walkways and may shift bags B from the adjacent hand truck 31 across the walkway 56 and into position on the platform 52A. This shifting operation involves supporting the bag B as it is moved across the walkway 56, but does not involve lifting of the bag because in every instance the hand trucks 31 support the bags at or above the level of the platform 52A. Moreover, no orienting movements are involved. After a tier of bags has been assembled on the platform 52A, the pusher plate 52B is operated to push the tier B of bags from the platform 52A onto the platform 55P, and if necessary the wheeled assembler 52 may be moved endwise toward the platform 55P as required.

The self propelled lift truck 55 has the usual provision for raising and lowering the platform 55P, and for loading, this platform 55P is lowered slightly below the platform 52A. When the platform 55P has been loaded, it is raised or lowered to the approximate level at which the tier of bags is to be deposited within the transport body 51, and the truck 55 is advanced so that the platform 55P is located substantially over the position that is to be occupied by the tier of bags.

For the purpose of discharging the tier of bags from the platform 55P, the lift truck 55 has a pusher plate 55B mounted so as to move up and down with the platform 55P and for movement in a forward direction across the platform 55P. Thus after the platform 55P is in position over the location that is to be occupied by the tier of bags, the pusher plate 55B is actuated in an advancing or forward direction and the lift truck itself is moved in a rearward direction at a speed substantially corresponding to the speed of the movement of the pusher plate 55B. Through this action, the platform 55P is withdrawn from beneath the tier of the bags, and the tier of bags is deposited in the location that is desired.

THE INITIAL GATHERING AREA 33

In FIGURES 2 and 3 the initial gathering area 33 is illustrated as comprising a plurality of conveyors of the belt type, these conveyors being indicated at 33C, and the individual conveyors may be operated to advance the bags toward the walkway 34. The worker who is to orient the bags B and transfer the same from the gathering area 33 onto the conveyor 35 may thus grasp a bag B that is located at the adjacent edge of the area 33 and may move it across the walkway 34 and onto the conveyor 35 which in the portion that is opposite the area 33 is at a substantially lower level than the area 33. This transfer operation is facilitated through the use of the shiftable or movable sloping bridge 36 which is mounted at opposite sides of the walkway 34. Hence the worker may orient the bag and transfer the same across the walkway with very little effort, and when the bag B is in position on the conveyor 35, it is in an oriented relationship which it will maintain throughout the balance of the moving, transferring and loading operations that are involved in the system.

It has also been pointed out that the initial gathering area 33 may be so constructed that the bags move more or less by gravity toward the walkway 34, and such an arrangement is shown in FIGURE 3A of the drawings where a sloping floor is provided which slopes toward the walkway 34 and which is identified as 33S in FIGURE 3A. The bags are supplied to the gathering area in any conventional way as by dumping the same from trucks onto the area 33 or the bags may be fed to the gathering area as by means of a chute or a conveyor 133 that has its discharge end located over the gathering area.

THE TRANSFER STATION 37

When the bags B have been placed as above described on the conveyor 35 in the proper oriented relationship, they are advanced by the conveyor toward and into the transfer station 37, intermediate portions of the conveyor 35 being arranged to move upwardly in the portion 35A, FIGURE 2, so that the bags B may then move on a horizontal portion of the conveyor 35 into the transfer elevated station 37.

Upon reaching the transfer station 37, the loading bag B strikes the control or trip arm 38 which in turn causes operation of the transfer pusher plate 39 to push the bag laterally off of the conveyor 35 and onto the distributing conveyor 40. The transfer or pusher plate 39 is herein shown as being supported on a shelf-like structure 39S carried on one side of the conveyor supporting frame, and in the elongated hydraulic cylinder and piston devices 39C mounted on the shelf-like structure 39S.

THE ROUTING SYSTEM

When the bag B has thus been pushed or transferred onto the distributing belt 40, it is within easy reach of a worker standing on the platform 41 which provides the routing station. The worker can thus reach the tab L and may determine the destination of the bag B, and this worker may then set the control device 45 so that this particular bag will be moved off of the conveyor 40. The control device 45 may be of the conventional key set type which embodies a settable memory unit timed with the advancing movement of the conveyor 40 and effective when a bag B moved into position at the selected station 42, to operate the pusher mechanism 44 of that station 42.

BAG COLLECTION AND ORIENTED LOADING OF HAND TRUCKS

The several gathering or collecting stations 42 are of identical construction, and the details of such construction are shown in FIGURES 4 to 6 of the drawings. Thus each gathering station 42 comprises an upstanding framework composed of four vertical posts 60 arranged in a rectangular relationship as will be evident at FIGURE 4, and at their upper ends, the two posts 60 on each side of the framework are connected by a channel bar 61. This connection is such that the open sides of the channel bars face each other for purposes that will appear hereinafter, and the bars 61 extend from one end of the framework over the conveyor 40 as will be evident particularly in FIGURES 4 and 5. The channel bars 61 are connected by a pair of cross bars 62 near the projecting portions thereof, while the posts 60 at the other end of the channel bars 61 are connected by a cross bar 63.

The frame that is provided by the columns 60 and the cross bars 62 and 63 have a width such that a truck 31 may be moved endwise through the open end of the framework and into position close to one side of the conveyor 40 but at substantially lower level, and means are provided on the framework for moving bags B one by one off of the conveyor 40 and through positions on the framework and above the truck 31 so that these bags B may be dropped onto the truck 31. A pair of guide plates 60P are preferably secured to the posts 60 on opposite sides of the truck position for guiding the bags B as they drop into position on the truck 31. For the purpose of gathering and initially supporting the bags at the station 42, a drop platform means is provided on the framework of the station 42. As shown, the pairs of posts 60 at opposite sides of the framework have rock shafts 64 extended therebetween at a level just slightly below the level of the conveyor 40, and each of these rock shafts 64 has a platform structure 65 extended therefrom toward the center of the framework. The rock shafts 64 are urged by counterweights 66 to normal positions wherein the platforms 65 are in the aligned horizontal positions shown in FIGURE 6, and a pair of depending hooks 68 are arranged so that those hooks engage the respective platforms 65 to hold the platforms 65 in their horizontal positions. The hook members 68 may, however, be moved in a direction away from the conveyor 40, as will be described to release the platforms 65, and this is done when bags B on the platform are to be dropped onto the truck 31.

The platforms 65 are arranged to receive bags as they are moved laterally off of the conveyor 40 and the bags are actuated under control of the storage means or routing mechanism 45 by means mounted on the top portions of the framework that constitutes the gathering station 42. Thus a pusher frame 70 has rollers 70R at its opposite edges riding in the channels 61, and this pusher frame 70 has a downwardly extending pusher plate 73 fixed on its left hand end as viewed in FIGURES 4 and 5. Thus by movement of the pusher frame 70 to the right, FIGURES 4 and 5, bag B may be moved laterally off of the conveyor 40 and onto the supporting platforms 65. This is accomplished in the present instance by a hydraulic piston and cylinder device 75 that is carried on the cross bars 62 midway between the chanels 61. The piston and cylinder device 75 has a piston 75P connected to the frame 70.

As a bag B is pushed off of the conveyor 40 it is moved onto an adjacent portion of the platforms 65, and as successive bags are moved onto the platforms 65, the previously discharged bags are advanced so that a group of bags are gathered on the platforms 65. As will be evident in FIGURES 4 and 5, when the pusher 73 moves from its solid line position to the dotted line position of FIGURE 5, a bag is moved off of the conveyor 40, and as the stroke of the pusher 73 continues, the bags B are moved further to the right in FIGURE 5, and the supporting hooks are disengaged. The weight of the bags then tilts the platforms 65 so that the bags are dropped onto the hand trucks 31. The counterweights then quickly return the platforms 65 to the position shown in FIGURE 6.

LOADING OF SIDE-OPENING TRANSPORT BODIES

When a sufficient number of hand trucks 31 have been loaded with respect to a particular destination, and have been accumulated on the storage floor 50, the bags B from the trucks 31 may be loaded into a transport body such as the railway car body 51 shown in FIGURES 1, 7 and 8 of my Patent 3,164,271, which may be referred to for a complete description of these aspects of my invention.

ALTERNATIVE FORMS OF BAG COLLECTING AND TRUCK LOADING STATIONS

In FIGURES 7 and 8 of the drawings, an alternative form of bag collecting and truck loading station 142 is illustrated. In the station 142 an upright frame is provided in the same manner as in the previously described station 42, but the frame in this instance is somewhat lower so that its top bars, identified as 166, may extend beneath the conveyor 40 as shown in FIGURE 7. On the top of the framework, a reciprocable platform 188 is provided that is supported by wheels 188W on the rails 166. The platform 188 is adapted to move from the position shown in full lines in FIGURE 7 to a retracted left hand position indicated in dotted outline, and such reciprocation is obtained by means of an endless chain drive 189 which is in turn operated by a reversible drive motor 190. The platform is connected to the upper run of the chain 189 by downward projecting lugs 188L.

Initially, the platform 188 is positioned so that it projects to the right from the right hand edge of the conveyor 40 by an amount somewhat more than the width of a bag B, and means are provided in association with the conveyor unloading pusher 144 so that when a bag has been moved laterally off of the conveyor 40 and onto the platform 188, the platform will be advanced in a righthand direction, FIGURE 7, in an amount equal to the width of the bag. This provides space on the platform 188 to receive the next bag. After a predetermined number of bags have been discharged onto the platform 188, or in other words, when the platform 188 has reached its most righthand position where it is shown in FIGURE 7, the drive motor 190 is reversed automatically, as by a reversing switch, and the platform 188 is moved to the left. The left hand bag B strikes the side of the frame of the conveyor 40, and thus movement of the bags is stopped. As the platform 188 continues its lefthand movement, the bags B are dropped off of the righthand end of the platform 188 so that the bags drop into adjacent positions in a tier on the hand truck 31 that is positioned beneath the platform 188. After the platform 188 reaches its most lefthand position, the motor 190 is reversed so as to project the platform 188 to the right to the above described initial position.

It might be pointed out in FIGURES 7 and 8, a different form of pusher 144 is provided, the pusher in this instance being suspended from a pivot shaft 144S which is in turn carried by an overhead beam 144B.

In FIGURES 9 and 10 another form of gathering and truck loading station 242 is illustrated, and here again the framework of the station is relatively low and has top rails 261 that extend to the left beneath the framework of the conveyor 40. In this instance a moving carriage 288 is mounted by means including wheels 288W on the rails 261, and an endless chain 289 driven by a reversible motor 290 has its upper run connected to the moving carriage 288. The carriage 288 in this instance has an endless belt conveyor 292 mounted thereon, and driven by a motor 293 that is supported on the carriage.

The carriage 288 is initially positioned in the full line relationship shown in FIGURE 9, and through operation of the chain 289, the carriage 288 may be moved to the left to the dashed line position shown in FIGURE 9. The conveyor belt 292 may be constantly operated so that when a bag is pushed laterally off of the side of the conveyor 40 by a pusher such as the pusher 244, the bag will drop onto the conveyor 292 and will move to the right and then be dropped downward off of the righthand end of the conveyor 292. The operating motor 290 for the carriage 288 is then controlled in timed relation to the pusher 244 so that when a bag has been dropped off of the end of the conveyor 292, the carriage 288 will be moved to the left in an amount substantially equal to the width of the bag. With this arrangement the next bag that is deposited on the conveyor 292 will be dropped into a different but adjacent position on the hand truck 31. When the carriage 288 has moved entirely to its left hand position of FIGURE 9, the control for the motor 290 is reversed and the carriage 288 is returned to the initial position shown in full lines in FIGURE 9.

CONCLUSION

From the foregoing description it will be apparent that the present invention provides an improved system for handling, sorting and loading bagged mail, whereby the labor costs and time required are materially reduced and the danger of the workers incurring back injuries or the like is particularly eliminated. It will be evident that the present invention provides such a system where walking, stooping and lifting are minimized, and the character of the work involved is made more desirable.

It will also be apparent that the present invention provides a mail handling system wherein the bags are oriented early in the cycle of operations, and wherein this originally established orientation is preserved throughout all of the subsequent handling operations so that the physical effort and time that has heretofore been required in repeated reorientation of the bags is eliminated.

It will also be apparent that the present invention provides a system wherein any handling operations with respect to the bags require merely turning or support of the bags and do not involve actual lifting of the bags, and it will also be apparent that under the present invention, the system of handling mail bags is of such a character that maximum use may be made of power lifting and transporting machines.

Thus while I have illustrated and described preferred examples and embodiments of my invention it is to be understood that changes and variations may be made by those skilled in the art without departing from the spirit.

I claim:

1. In a system for handling random assortments of loaded mail bags of uniform lengths and labelled as to their destination including a conveyor for moving the bags along a predetermined path that passes a plurality of collecting stations allocated to different destinations and means for positioning the bags one-by-one on the conveyor oriented to extend longitudinally thereof, the method of collecting those of the bags carried by the conveyor that are allocated to a common destination by virtue of being commonly labeled into a balanced vertical stack of one or more tiers of similarly oriented bags on a sideless hand truck for subsequent handling of the stack as a unit, with the hand truck being of the type comprising a wheeled frame having an upstanding load support at either end thereof between which the mail bag stack is to rest on a platform that is open along the sides of the frame between said load supports, with the hand truck being positioned at a collecting station for said allocated bags located at a predetermined position along the length of said conveyor, said method comprising:

moving said loaded bags along said path while maintaining said orientation thereof, displacing said allocated bags from said path at said collecting station for said allocated bags while maintaining said orientation thereof, indexing the individual displaced bags above the hand truck and in substantial vertical alignment with and above the tier forming position they are to occupy in said stack while maintaining said orientation thereof, and dropping the displaced bags onto the hand truck into said indexed position to form said balanced stack while maintaining said orientation of said bags and guiding their ends to dispose said ends on either side of the stack in substantial vertical alignment.

References Cited

UNITED STATES PATENTS

| 1,432,086 | 10/1922 | Plonka. |
| 2,139,667 | 12/1938 | Brauer. |
| 2,396,090 | 3/1946 | Curtis. |
| 2,636,622 | 4/1953 | Saxe _____ 214—11 |
| 2,846,086 | 8/1958 | Norwood. |
| 2,977,002 | 3/1961 | Asp. |
| 3,126,105 | 3/1964 | Marquet. |
| 3,150,786 | 9/1964 | Pratt. |

GERALD M. FORLENZA, Primary Examiner

ROBERT J. SPAR, Assistant Examiner